(12) United States Patent  
Mock

(10) Patent No.: US 9,019,335 B2  
(45) Date of Patent: Apr. 28, 2015

(54) ABSTRACTING BRIDGE CONTROL IN A VIDEOCONFERENCING SYSTEM

(71) Applicant: Logitech Europe S.A., Morges (CH)

(72) Inventor: Wayne E. Mock, Round Rock, TX (US)

(73) Assignee: Logitech Europe S.A., Morges (CH)

( * ) Notice: Subject to any disclaimer, the term of this patent is extended or adjusted under 35 U.S.C. 154(b) by 131 days.

(21) Appl. No.: 13/751,708

(22) Filed: Jan. 28, 2013

(65) Prior Publication Data

US 2014/0210938 A1 Jul. 31, 2014

(51) Int. Cl.
| H04N 7/14 | (2006.01) |
| H04N 7/15 | (2006.01) |
| H04L 29/06 | (2006.01) |

(52) U.S. Cl.
CPC .................. *H04N 7/15* (2013.01); *H04N 7/152* (2013.01); *H04L 65/4038* (2013.01)

(58) Field of Classification Search
None
See application file for complete search history.

(56) References Cited

U.S. PATENT DOCUMENTS

| 7,312,809 | B2 | 12/2007 | Bain et al. | |
| 7,321,384 | B1 | 1/2008 | Wu et al. | |
| 7,679,638 | B2 | 3/2010 | Eshkoli et al. | |
| 7,679,640 | B2 * | 3/2010 | Eshkoli et al. | 348/14.09 |
| 7,940,294 | B2 | 5/2011 | Wu et al. | |
| 8,576,276 | B2 * | 11/2013 | Bar-Zeev et al. | 348/53 |
| 2007/0064901 | A1 * | 3/2007 | Baird et al. | 379/202.01 |
| 2007/0126858 | A1 * | 6/2007 | Bain et al. | 348/14.01 |
| 2011/0205333 | A1 * | 8/2011 | Wu et al. | 348/14.08 |
| 2012/0062687 | A1 * | 3/2012 | Sai et al. | 348/14.03 |
| 2013/0109412 | A1 * | 5/2013 | Nguyen et al. | 455/456.3 |

OTHER PUBLICATIONS

U.S. Appl. No. 13/327,929, entitled "Providing User Input Having a Plurality of Data Types Using a Remote Control Device", filed Dec. 16, 2011, inventor Wayne E. Mock.

* cited by examiner

*Primary Examiner* — Maria El-Zoobi
(74) *Attorney, Agent, or Firm* — Meyertons Hood Kivlin Kowert & Goetzel, P.C.; Jeffrey C. Hood; Matthew C. Washburn

(57) ABSTRACT

Controlling a bridge in a videoconferencing system through a remote endpoint. The endpoint may receive a generic menu-navigation user input command, such as a navigation command from a simple remote control device. The endpoint may then convert the user input into a bridge control command comprising at least one of a dual-tone multi-frequency (DTMF) signal or a far-end camera control (FECC) signal. The use of DTMF and FECC signals is transparent to the user.

11 Claims, 11 Drawing Sheets

ABSTRACTING BRIDGE CONTROL IN A VIDEOCONFERENCING SYSTEM

FIELD OF THE INVENTION

The present invention relates generally to controlling a videoconferencing bridge and, more specifically, to abstracting bridge control procedures.

DESCRIPTION OF THE RELATED ART

Videoconferencing may be used to allow two or more participants at remote locations to communicate using both video and audio. Each participant location may include a videoconferencing endpoint for video/audio communication with other participants. Each videoconferencing endpoint may include a camera and microphone to collect video and audio from a first or local participant to send to another (remote) participant. Each videoconferencing endpoint may also include a display and speaker to reproduce video and audio received from one or more remote participants. Each videoconferencing endpoint may also be connected to (or comprise) a computer system to allow additional functionality into the videoconference. For example, additional functionality may include data conferencing (including displaying and/or modifying a document for both participants during the conference).

A multipoint control unit (MCU), as used herein, may operate to help connect multiple codecs or endpoints together so that a multiparty (i.e., more than 2 participants) call is possible. An MCU may also be referred to as a bridge, and the two terms are used interchangeably herein. An MCU is a videoconference controlling entity typically located in a node of the network, and may be included in one or more of the endpoints/codecs. Such an MCU may be referred to as an embedded MCU, because it is part of the endpoint/codec itself. The MCU receives several channels from access ports, processes audiovisual signals according to certain criteria, and distributes the audiovisual signals to the connected channels. The information communicated between the endpoints and the MCU may include control signals, indicators, audio, video, and/or data.

A videoconferencing endpoint may control components of a remote endpoint or bridge using specific control signals, including dual-tone multi-frequency (DTMF) signals or far-end camera control (FECC) signals, such as those defined by the H.323 standard. H.323 is a standard defined by the International Telecommunications Union. However, utilizing such control signals typically requires advanced user knowledge and/or complex series of user inputs. Therefore, videoconferencing systems must typically display additional instruction, informing the user regarding how to utilize such control signals. Further, if a videoconferencing endpoint may be controlled through a remote control device, these complex user inputs typically require a remote control device that is overly complex and frustrating to users. For example, current videoconferencing endpoints often have associated remote control devices where individual buttons have overloaded functionality that is not apparent or ergonomic to a lay user. Accordingly, the user is often forced to look between a user interface presented on the display of the videoconferencing endpoint and the buttons on the remote control device multiple times to perform even simple tasks. Additionally, videoconferencing endpoints may have associated remote control devices that are dedicated to a single function, such as camera control, such that multiple remote control devices are required to control the videoconferencing endpoint.

Thus, improvements in controlling a bridge through a remote videoconferencing endpoint are desired.

SUMMARY OF THE INVENTION

Various embodiments are presented of a system and method for controlling a videoconferencing bridge through a remote videoconferencing endpoint. FECC signals and DTMF signals may be transmitted by the endpoint to control the bridge, while the use of these signals is transparent to the user.

A method is presented for controlling a bridge, wherein the method is performed by an endpoint. The endpoint may call a bridge to join a videoconference. The endpoint may receive a video stream from the bridge, wherein the video stream may comprise a UI menu generated by the bridge. In some embodiments, the video stream may further comprise metadata. The endpoint may examine the metadata to determine whether the UI menu is present in the video stream. The endpoint may display the video stream on the display. The endpoint may then receive user input to interact with the UI menu contained within the video stream.

In some embodiments, the receiving user input may comprise receiving user input selecting a user input element of the UI menu. The endpoint may convert the user input into at least one bridge control command, wherein the bridge control command comprises at least one of a FECC signal or a DTMF signal. The endpoint may transmit the bridge control command to the bridge, wherein the command is configured to navigate the UI menu. The endpoint may then receive from the bridge an updated video stream comprising an updated UI menu, which reflects the user input.

A method is presented for controlling a bridge, wherein the method is performed by an endpoint. The endpoint may receive from the bridge a video stream comprising metadata. The endpoint may determine, based on the metadata, command conversion information for the bridge. The endpoint may receive user input comprising generic menu-navigation user commands. The endpoint may convert the user input into at least one bridge control command comprising at least one of a FECC signal or a DTMF signal.

A method is presented for controlling a bridge, wherein the method is performed by a bridge. The bridge may receive a call from an endpoint. The bridge may generate a UI menu that does not include information regarding how to navigate within the UI menu. The bridge may transmit to the endpoint a video stream comprising the UI menu. The bridge may receive a bridge control command from the endpoint, the command comprising a FECC signal and/or a DTMF signal. The bridge control command may be configured to navigate the UI menu. The bridge may generate an updated UI menu. The bridge may transmit to the endpoint an updated video stream comprising the updated UI menu.

In some embodiments, upon receiving the call from the endpoint, the bridge may determine, based upon metadata comprised in the call, whether the bridge can couple with the endpoint. If the bridge cannot couple to with the endpoint, the bridge may generate a UI menu that does include information regarding how to navigate within the UI menu.

A method is presented for controlling a bridge, wherein the method is performed by a bridge. The bridge may receive metadata from an endpoint. The bridge may determine, based upon the metadata, whether the bridge can couple with the endpoint. If the bridge cannot couple with the endpoint, the bridge may transmit to the endpoint a video stream comprising information regarding how to configure the bridge. If the bridge can couple with the endpoint, the bridge may transmit to the endpoint a video stream that does not comprise information regarding how to configure the bridge. In either case, the bridge may receive a bridge control command from the endpoint, the command comprising a FECC signal and/or a DTMF signal.

BRIEF DESCRIPTION OF THE DRAWINGS

A better understanding of the present invention can be obtained when the following detailed description of the embodiments is considered in conjunction with the following drawings.

FIGS. 6-8 illustrate exemplary embodiments of user interface (UI) menus generated by a bridge in a videoconferencing system;

Figure 1:
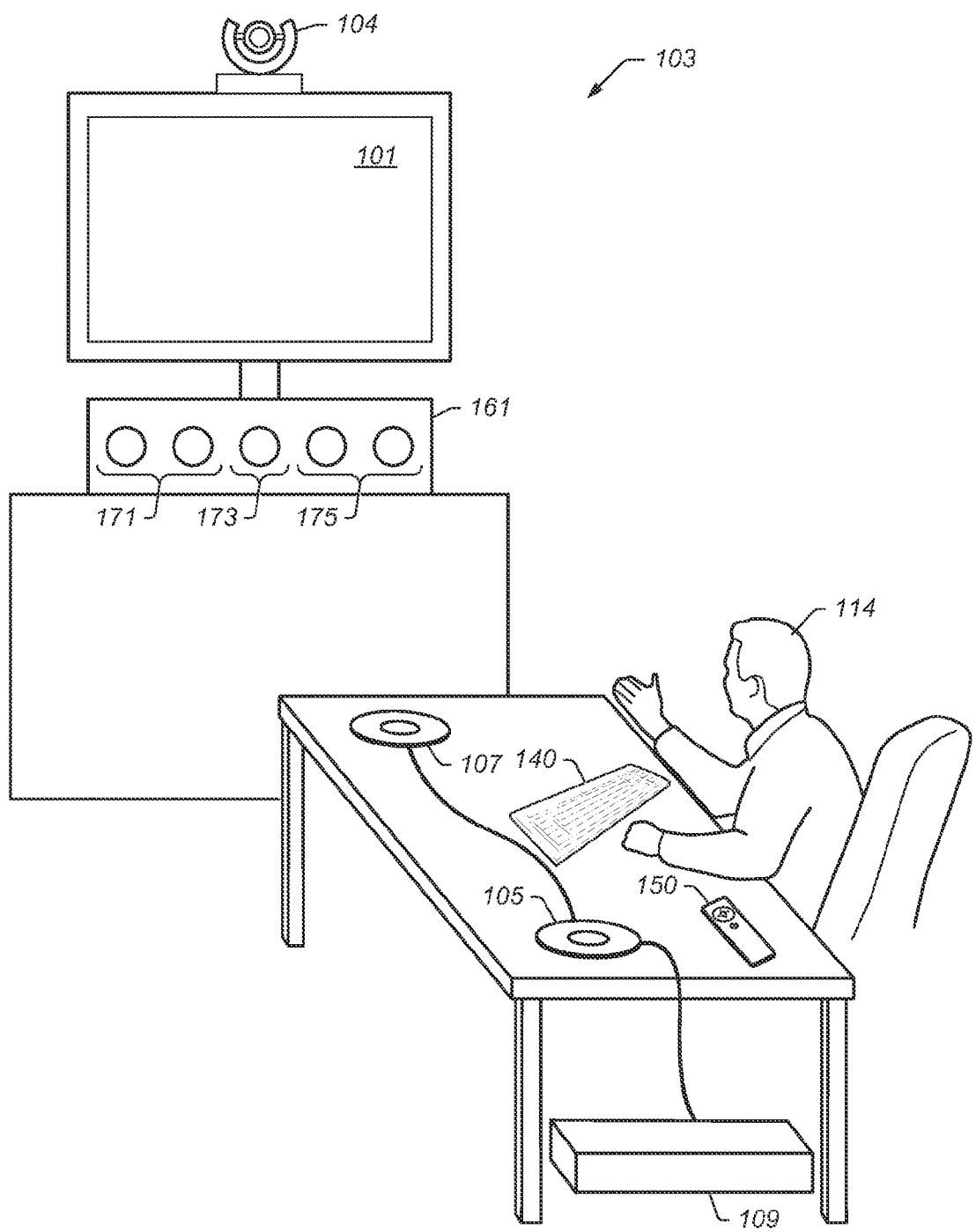
FIG. 1 illustrates an exemplary videoconferencing endpoint, according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Exemplary Videoconferencing Endpoint

FIG. 1 illustrates an exemplary embodiment of a videoconferencing endpoint at a participant location. The videoconferencing endpoint may be configured to perform embodiments described herein, such as the provision of various user interfaces. The videoconferencing endpoint 103 may have a system codec (or videoconferencing unit) 109 to manage both a speakerphone 105/107 and videoconferencing hardware, e.g., camera 104, display 101, speakers 171, 173, 175, etc. The speakerphones 105/107 and other videoconferencing endpoint components may be connected to the codec 109 and may receive audio and/or video signals from the system codec 109.

In some embodiments, the videoconferencing endpoint may include camera 104 (e.g., an HD camera) for acquiring images (e.g., of participant 114) of the participant location. Other cameras are also contemplated. The videoconferencing endpoint may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints).

The videoconferencing endpoint may further include one or more input devices, such as the computer keyboard 140. In some embodiments, the one or more input devices may be used for the videoconferencing endpoint 103 and/or may be used for one or more other computer systems at the participant location, as desired.

The videoconferencing endpoint may also include a sound system 161. The sound system 161 may include multiple speakers including left speakers 171, center speaker 173, and right speakers 175. Other numbers of speakers and other speaker configurations may also be used. The videoconferencing endpoint 103 may also use one or more speakerphones 105/107 which may be daisy chained together.

Figure 2:
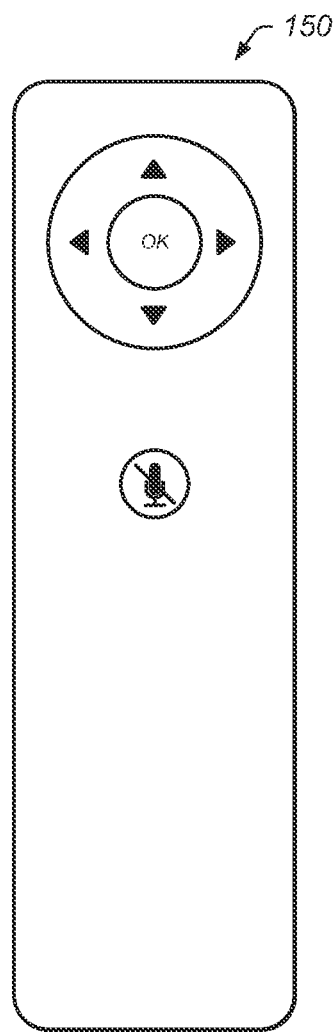
FIG. 2 illustrates an exemplary simple remote control device for interacting with user interfaces, according to an embodiment.

In some embodiments, the videoconferencing endpoint components (e.g., the camera 104, display 101, sound system 161, and speakerphones 105/107) may be connected to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another videoconferencing endpoint, or to an MCU for provision to other conferencing systems. The videoconferencing endpoint may be controlled by a participant or user through various mechanisms, such as a remote control device 150. The remote control device 150 may be implemented with a plurality of inputs, such as physical buttons and/or with a touch interface. In some embodiments, the remote control device 150 may be implemented as a portion of other videoconferencing devices, such as the speakerphones 107 and/or 105, and/or as a separate device. FIG. 2 provides an exemplary embodiment of simple remote control device.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing endpoint 103 may be designed to operate with normal display or high definition (HD) display capabilities. The videoconferencing endpoint 103 may operate with network infrastructures that support T1 capabilities or less, e.g., 1.5 mega-bits per second or less in one embodiment, and 2 mega-bits per second in other embodiments.

Note that the videoconferencing endpoint(s) described herein may be dedicated videoconferencing endpoints (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing endpoint may be designed specifically for videoconferencing, and is not used as a general purpose computing platform; for example, the dedicated videoconferencing endpoint may execute an operating system which may be typically streamlined (or "locked down") to run one or more applications to provide videoconferencing, e.g., for a conference room of a company. In other embodiments, the videoconferencing endpoint may be a general use computer (e.g., a typical computer system which may be used by the general public or a high end computer system used by corporations) which can execute a plurality of third party applications, one of which provides videoconferencing capabilities. Videoconferencing endpoints may be complex (such as the videoconferencing endpoint shown in FIG. 1) or simple (e.g., a user computer system with a video camera, input devices, microphone and/or speakers). Thus, references to videoconferencing endpoints, endpoints, etc. herein may refer to general computer systems which execute videoconferencing applications or dedicated videoconferencing endpoints. Note further that references to the videoconferencing endpoints performing actions may refer to the videoconferencing application(s) executed by the videoconferencing endpoints performing the actions (i.e., being executed to perform the actions). A videoconferencing endpoint may include an embedded bridge, or other component of a videoconferencing system.

As described herein, the videoconferencing endpoint 103 may execute various videoconferencing application software that presents a graphical user interface (GUI) on the display 101. The GUI may be used to present an address book, contact list, list of previous callees (call list) and/or other information indicating other videoconferencing endpoints that the user may desire to call to conduct a videoconference. The GUI may also present options for recording a current videoconference, and may also present options for viewing a previously recorded videoconference.

Note that the videoconferencing endpoint shown in FIG. 1 may be modified to be an audioconferencing endpoint. For example, the audioconference could be performed over a network, e.g., the Internet, using VOIP. Additionally, note that any reference to a "conferencing endpoint" or "conferencing endpoints" may refer to videoconferencing endpoints or audioconferencing endpoints (e.g., teleconferencing endpoints). In the embodiments described below, the conference is described as a videoconference, but note that the methods may be modified for utilization in an audioconference.

When performing a videoconference, the various videoconferencing endpoints may be connected in a variety of manners. For example, the videoconferencing endpoints may be connected over wide area networks (e.g., such as the Internet) and/or local area networks (LANs). The networks may be wired or wireless as desired. During a videoconference, various ones of the videoconferencing units may be connected using disparate networks. For example, two of the videoconferencing endpoints may be connected over a LAN while others of the videoconference are connected over a wide area network. Additionally, the communication links between the videoconferencing units may be implemented in a variety of manners, such as those described in the patent applications incorporated by reference above.

FIG. 2—Exemplary Remote Control Device

FIG. 2 illustrates an exemplary remote control device 150 which may be used to implement various embodiments described herein. In this particular example, the remote control device 150 is a simple remote control device having relatively few inputs. As shown, the remote control device 150 includes directional inputs (up, down, left, right), a confirmation input (ok), and a mute input. Note that these inputs may be implemented as physical buttons, in a touch interface (e.g., with haptic or other physical feedback and/or physical features indicating the locations of the inputs), or in any other desirable manner. Generally, the simple remote control device 150 may be implemented in a manner that allows the user to use the remote control device 150 without having to look at the remote control device 150. More specifically, the remote control device 150 may be implemented such that a user may look at the remote control device 150 and begin to use the remote control device 150 without requiring further analysis of inputs or layout (e.g., due to its simplicity). This design may allow the user to visually focus only on the display 101 rather than dividing visual focus between the display 101 and the remote control device 150. Accordingly, in conjunction with a properly designed user interface may lead to a more efficient and pleasant user experience.

While only six inputs are shown in FIG. 2, more or fewer inputs may be used. For example, an additional menu input (e.g., for accessing or clearing menus), power input (e.g., for turning a device on or off), etc. may be added. However, while additional inputs are contemplated, for a simple remote control device, fewer than 8 or 10 inputs may be desired so that the user can easily remember the location and purpose of each input without requiring visual analysis. Simple remote control devices may typically avoid having dedicated alphanumeric inputs. More complex remote control devices are also envisioned (e.g., having more than 8 or 10 inputs), but design must be carefully implemented in order to overcome the typical deficiencies of complex remotes noted above.

Figure 3:
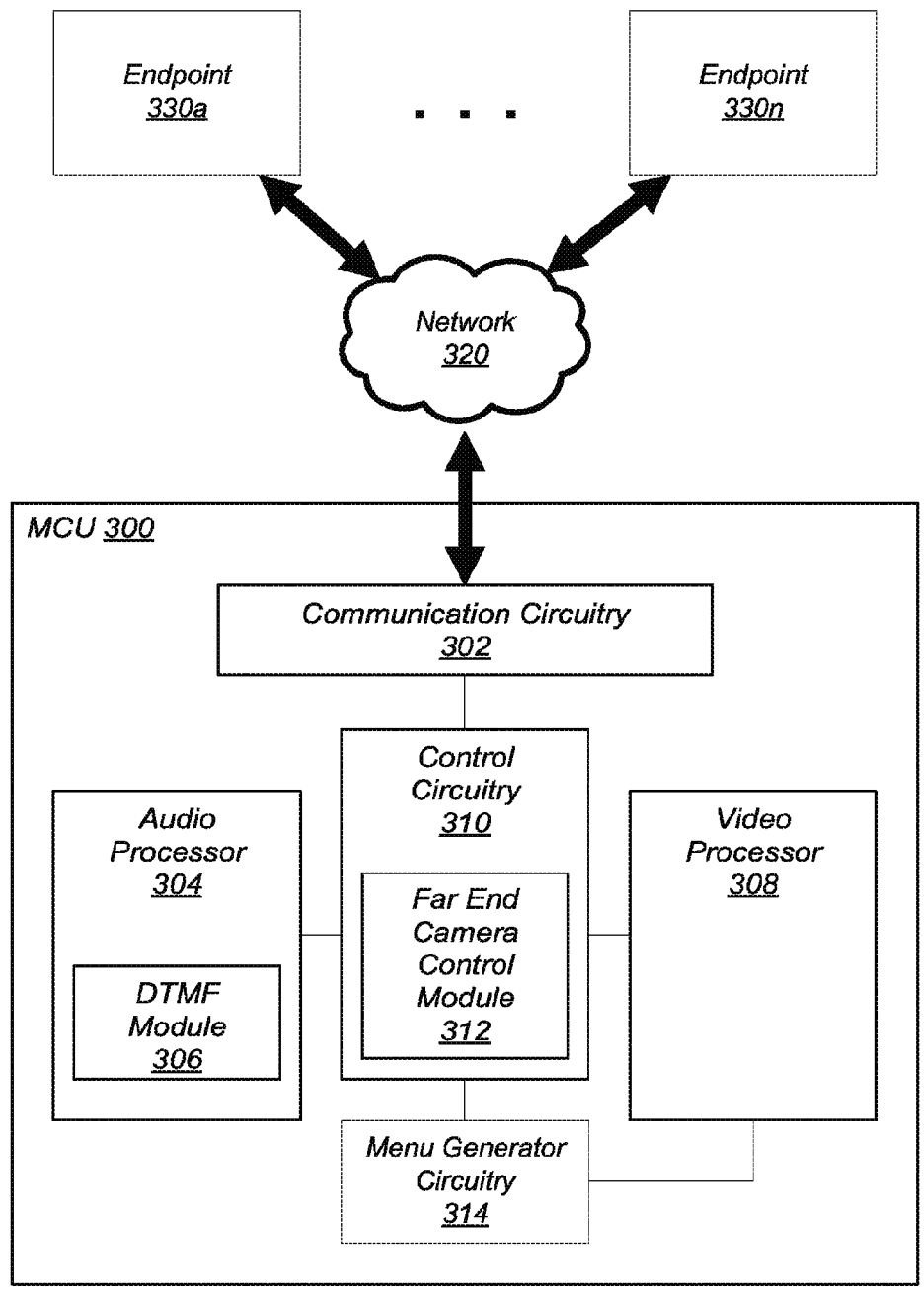
FIG. 3 illustrates an exemplary bridge, according to an embodiment.

FIG. 3—Exemplary Bridge

FIG. 3 illustrates an exemplary embodiment of an MCU 300, or bridge. The MCU may be configured to perform embodiments described herein, such as the provision of a video stream to endpoints 330a-330n via network 320.

An MCU is a videoconference controlling entity typically located in a node of the network, and may be included in one or more of the endpoints. The MCU is operable to receive videoconferencing data from one or more endpoints or other MCUs, process the videoconferencing data according to certain criteria, and transmit the processed videoconferencing data to one or more endpoints or other MCUs. In various embodiments, the MCU may be implemented in software, hardware, or a combination of both.

The videoconferencing data communicated between the endpoints 330a-330n and the MCU 300 may include control signals, indicators, audio, video, and/or data. The videoconferencing data may be communicated through a network 320, such as a LAN (local area network) or the Internet. The network may be wired or wireless, or both.

As illustrated, the MCU may comprise communication circuitry 302 capable of sending and receiving videoconferencing data via the network 320. When videoconferencing data arrives at MCU 300, the network interface module 302 may receive the videoconferencing data and pass it to the control circuitry 310. Such videoconferencing data may comprise one or more video streams from one or more endpoints 330a-330n. Such one or more video streams may be received by the communication circuitry 302 via multiple input channels. The network interface module 302 may also receive videoconferencing data from the control circuitry 310, and transmit the videoconferencing data to one or more of the endpoints 330a-330n.

The control circuitry 310 may receive videoconferencing data from the communication circuitry 302, and may further process the data. For example, the control circuitry 310 may route an audio component of the videoconferencing data to the audio processor 304, and may route a video component of the videoconferencing data to the video processor 308. The control circuitry 310 may also identify control or data components of the videoconferencing data. For example, the control circuitry 310 may identify metadata signals comprised in the videoconferencing data. The control circuitry 310 may comprise a FECC module 312, which may be configured to identify and process FECC signals comprised in the videoconferencing data. For example, the FECC module 312 may decide whether a FECC signal should be forwarded to a remote endpoint or processed as a bridge control command.

Upon receiving a control signal, e.g. a FECC signal identified by the FECC module 314 or a DTMF signal identified by the DTMF module 306, the control circuitry 310 may modify settings of the MCU 300 or send control signals to the menu generator circuitry 314, based upon the control signal received.

The control circuitry 310 may also send videoconferencing data to the communication circuitry 302 for transmission. The videoconferencing data may comprise audio data received from the audio processor 304 and video data received from the video processor 308. The videoconferencing data may also comprise metadata or control signals.

The audio processor 304 may receive audio data from the control circuitry 310, which may comprise audio portions of the videoconferencing data received from the endpoints 330a-330n. The audio processor 304 may also receive audio data from other sources, such as a local audio input device, not shown. The audio processor 304 is further configured to process the audio data according to certain criteria, and output the data to the control circuitry 310. For example, the audio processor 304 may composite the received audio data, and output the composite audio data. The audio processor 304 may comprise a DTMF module 306, which may recognize DTMF signals comprised in the received audio. Upon detecting a DTMF signal, the DTMF module may process the DTMF signal and output an appropriate control signal to the control circuitry 310.

The video processor 308 may receive video data from the control circuitry 310, which may comprise video portions of the videoconferencing data received from the endpoints 330a-330n. The video processor 308 may also receive video data from other sources, such as the menu generator circuitry 314 or a local video input device, not shown. The video processor 308 is further configured to process the video data according to certain criteria, and output the data to the control circuitry 310. For example, the video processor 308 may composite the received video data, and output the composite video data.

The menu generator circuitry 314 may receive control signals from the control circuitry 310. Based upon the control signals, the menu generator circuitry 314 may generate a user interface (UI) menu, and may provide the UI menu to the video processor 308. The video processor 308 may include the UI menu while processing the video data. For example, the video processor 308 may overlay the UI menu upon other the composite video data before outputting the video data to the control circuitry 310.

Figure 4A:
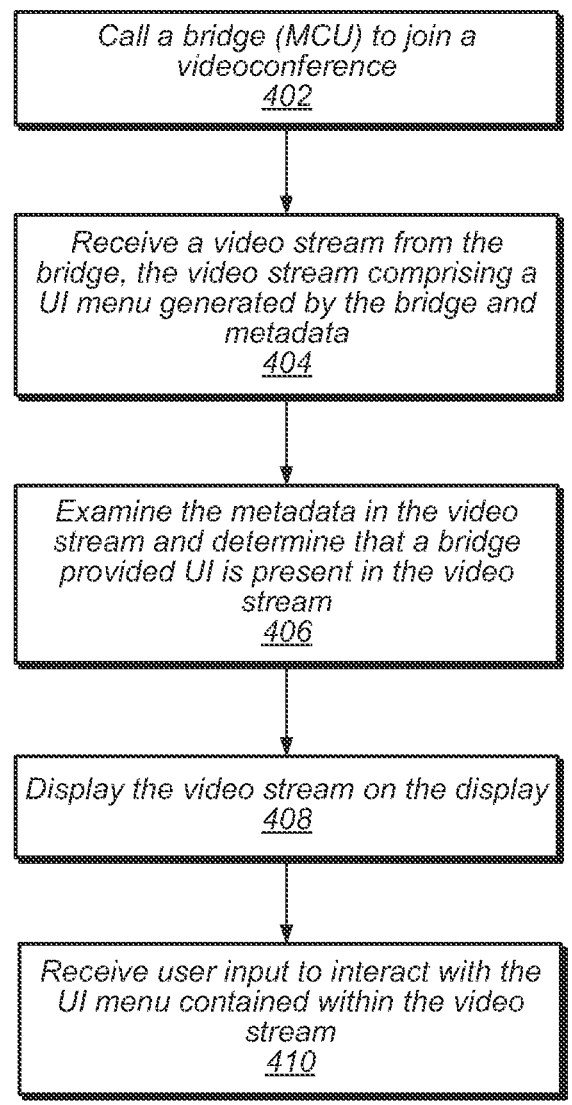
FIGS. 4A and 4B are flowchart diagrams illustrating embodiments of a method for controlling a bridge in a videoconferencing system.
Figure 4B:
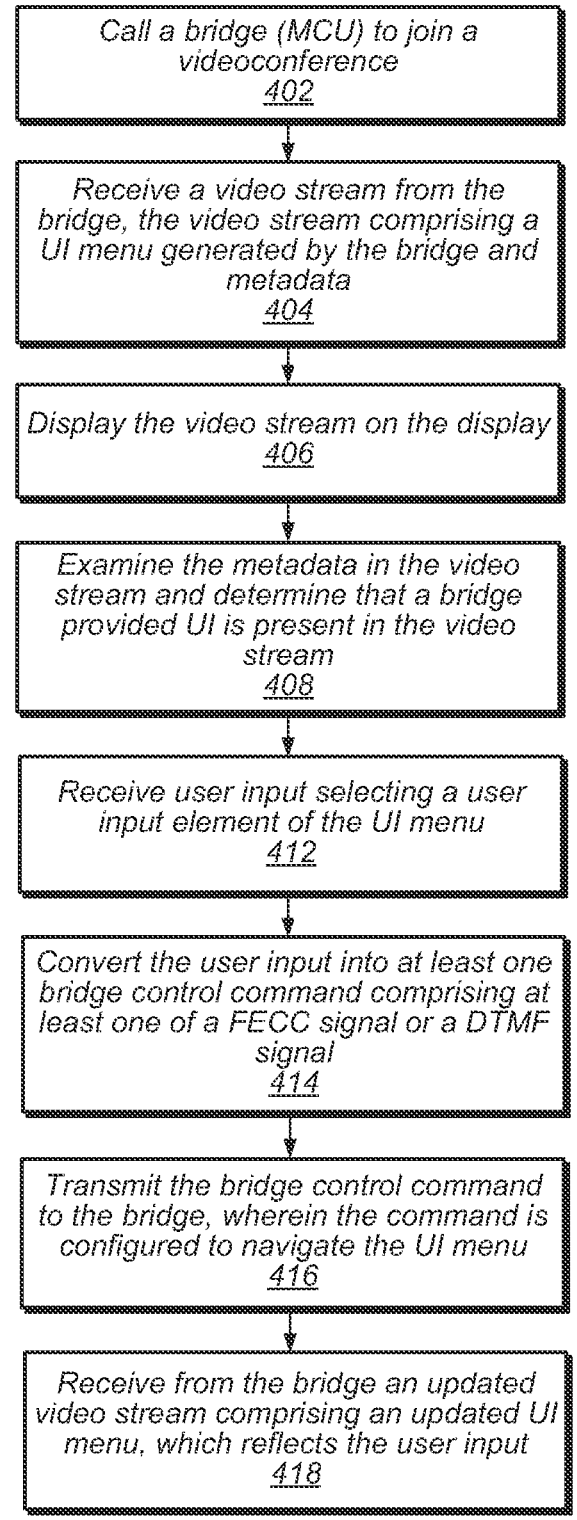

FIGS. 4A and 4B—Controlling a Bridge with a Remote Endpoint

FIGS. 4A and 4B are flowchart diagrams illustrating embodiments of a method for controlling a bridge in a videoconferencing system. The method shown in FIGS. 4A and 4B may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In some embodiments, the method is performed by a remote endpoint of the videoconferencing system. A remote endpoint is any endpoint of the videoconferencing system in which the bridge to be controlled is not embedded, although the bridge may be embedded in another endpoint of the videoconferencing system. A remote endpoint may or may not be physically located near the bridge.

In 402, an endpoint may call a bridge to join a videoconference. The videoconference may or may not be previously ongoing with other endpoints of the videoconferencing system. In some embodiments, during this calling, the endpoint may transmit to the bridge metadata that indicates device-type information regarding the endpoint. For example, the metadata may identify the manufacturer, product name, model number, and/or software version of the endpoint. For example, the transmission of metadata including Vendor Information is provided for in the H.323 standard and the Session Initiation Protocol (SIP). SIP is a protocol defined by the Internet Engineering Task Force (IETF).

In 404, the endpoint may receive a video stream from the bridge. The video stream may comprise a user interface (UI) menu generated by the bridge. The video stream may further comprise audio, video, and/or other data from endpoints of the videoconference system. The video stream may further comprise metadata from the bridge. This metadata may indicate device-type information regarding the bridge, and may further indicate an operating mode of the bridge. For example, the metadata may indicate that the bridge is in Virtual Operator mode.

As used herein, the term "Virtual Operator mode" refers to an operating mode of the bridge, in which a remote endpoint in communication with the bridge may interact with a conference associated with the bridge. For example, while communicating with a bridge in Virtual Operator mode, the remote endpoint may control the bridge to create a new conference, join a conference by entering a conference ID, or join a conference by choosing it from a list of available conferences presented by the bridge. It is to be understood that a Virtual Operator mode is merely one example of a possible operating mode of a bridge, and is not intended to be limiting. Some embodiments may not include a Virtual Operator mode. Further, in some embodiments, a bridge may not include distinct operating modes.

In 406, the endpoint may examine the metadata in the video stream, and determine, based on the metadata, whether the bridge has provided a UI menu in the video stream. For example, in some embodiments, the bridge may provide the UI menu only while in Virtual Operator mode. Thus, in such an embodiment, the endpoint may determine that the bridge has provided a UI menu in the video stream by determining that the metadata indicates that the bridge is in Virtual Operator mode. In some embodiments, the bridge may respond differently to input from the endpoint, based on the current operating mode of the bridge. Therefore, by examining the metadata in the video stream, the endpoint can determine how to interact with the bridge. Additionally, the endpoint may use device-type information comprised in the metadata to determine whether the bridge is of a type for which the endpoint is capable of converting generic menu-navigation user input commands into bridge control commands. If the endpoint determines that the bridge is of a type for which the endpoint is capable of converting generic menu-navigation user input commands into bridge control commands, the endpoint and the bridge may be referred to as "coupled" or "loosely-coupled." For example, the endpoint may comprise a list or table of bridge devices, manufacturers, software versions, or other device-type information identifying bridges with which the endpoint is capable of coupling.

Figures 6, 7:
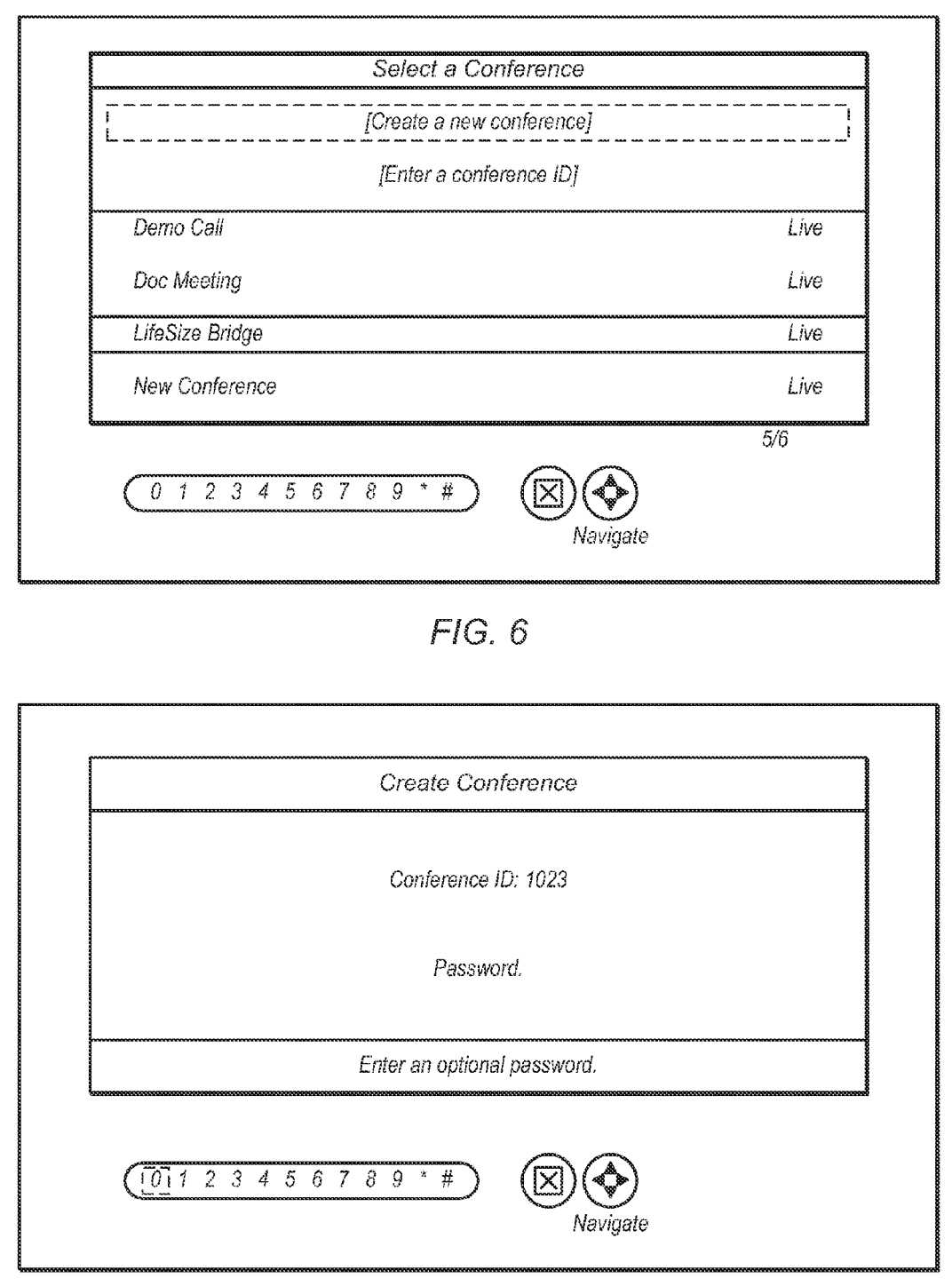

In 408, the endpoint may display the video stream on a display of the endpoint, such as display 101. By displaying the video stream comprising the UI menu, the endpoint presents the UI menu to a user of the endpoint. An exemplary UI menu is shown in FIG. 6. As shown, the UI menu may comprise a plurality of user interface elements. For example, the UI menu may comprise a user interface element, the selection of which will configure the bridge to add the endpoint to an ongoing conference. Other exemplary user interface elements are also shown, representing options to create a new conference or to otherwise configure the bridge. In some embodiments, the UI menu may be received with one user interface element highlighted.

In some embodiments, the endpoint may also display a local UI, generated by the endpoint. In some embodiments, the UI menu generated by the bridge may have an appearance and feel similar or identical to the local UI. As used herein, the "appearance and feel" of a UI may refer to both the graphical style of the UI and to the manner of the user interacting with the UI. Thus, in an embodiment in which the bridge has the appearance and feel of the local UI, the user would be capable of navigating both the local UI and the UI menu generated by the bridge by using the same control device in essentially the same manner, without requiring additional instruction or a change of operating mode of the endpoint. In some embodiments, the local UI and the UI menu generated by the bridge may be so similar that a user is unable to distinguish that the two UIs are generated by different devices; i.e. that the local UI is generated by the endpoint, and the UI menu is generated by the bridge. In some embodiments, the endpoint may hide the local UI, or some portion of the local UI, in response to determining that the bridge has provided a UI menu in the video stream. This helps to make the transition from the local UI to the UI menu generated by the bridge more seamless to the user.

In some embodiments, the endpoint does not receive from the bridge any information regarding how to navigate within the user interface menu. In some embodiments, the endpoint does not present to the user any information regarding how to navigate within the user interface menu. In some embodiments, no user instruction is needed, because the UI menu has the appearance and feel of the local UI, with which the user is already familiar.

In 410, in FIG. 4A, the endpoint may receive user input to interact with the UI contained within the video stream. In some embodiments, the user input may be to navigate within the UI menu and select one or more user interface elements within the user interface menu to control one or more aspects of the videoconference. For example, if the endpoint has an associated remote control device, such as remote control device 150, the user may navigate within the UI menu using directional arrow buttons. For example, in the exemplary UI menu of FIG. 6, the user interface element [Create a new conference] is shown as highlighted. The user could highlight the user interface element [Enter a conference ID] by pressing the down arrow. Alternatively, the user could select the user interface element [Create a new conference] by pressing the OK button.

FIG. 4B illustrates further details of an embodiment of step 410.

In 412, in FIG. 4B, the endpoint may receive user input selecting a user input element of the UI menu. For example, in the exemplary UI menu of FIG. 6, the user could press the OK button on remote control device 150. In this example, the endpoint would receive the user input selecting user input element [Create a new conference] of the UI menu.

In 414, the endpoint may convert the user input into at least one bridge control command comprising at least one of a FECC signal or a DTMF signal. For example, received user input corresponding to the user pressing the OK button on remote control device 150 may be converted to a DTMF signal corresponding to pressing a "#" button on a telephone. Alternatively, the user input may be converted to a FECC signal corresponding to camera zoom. It is to be understood that these specific conversions are only exemplary; a received user input may be converted into any bridge control command comprising at least one of a FECC signal or a DTMF signal. In some embodiments, the conversion depends at least in part upon the metadata in the video stream. For example, in some embodiments, the conversion may be customized for the hardware or software type of the bridge, or for the operating mode of the bridge, as indicated by the metadata in the video stream. In some embodiments, the endpoint may convert the user input only if the endpoint and the bridge are coupled.

In 416, the endpoint may transmit the bridge control command to the bridge. In some embodiments, the bridge control command is configured to navigate the UI menu. Specifically, the bridge control command is configured to execute the selection indicated by the user input. For example, if a user had pressed the OK button on remote control device 150 while the endpoint displayed the exemplary UI menu of FIG. 6, the endpoint may transmit to the bridge a bridge control command configured to cause the bridge to select the user input element [Create a new conference] of the UI menu.

In 418, the endpoint may receive from the bridge an updated video stream comprising an updated UI menu. The updated UI menu may reflect the user input. For example, if a user had pressed the OK button on remote control device 150 while the endpoint displayed the exemplary UI menu of FIG. 6, the updated video stream may comprise the exemplary updated UI menu of FIG. 7. The exemplary updated UI menu of FIG. 7 illustrates a menu to allow a user to create a new videoconference. This updated UI menu reflects the user input selecting the user input element [Create a new conference] of the UI menu of FIG. 6.

Figure 5A:
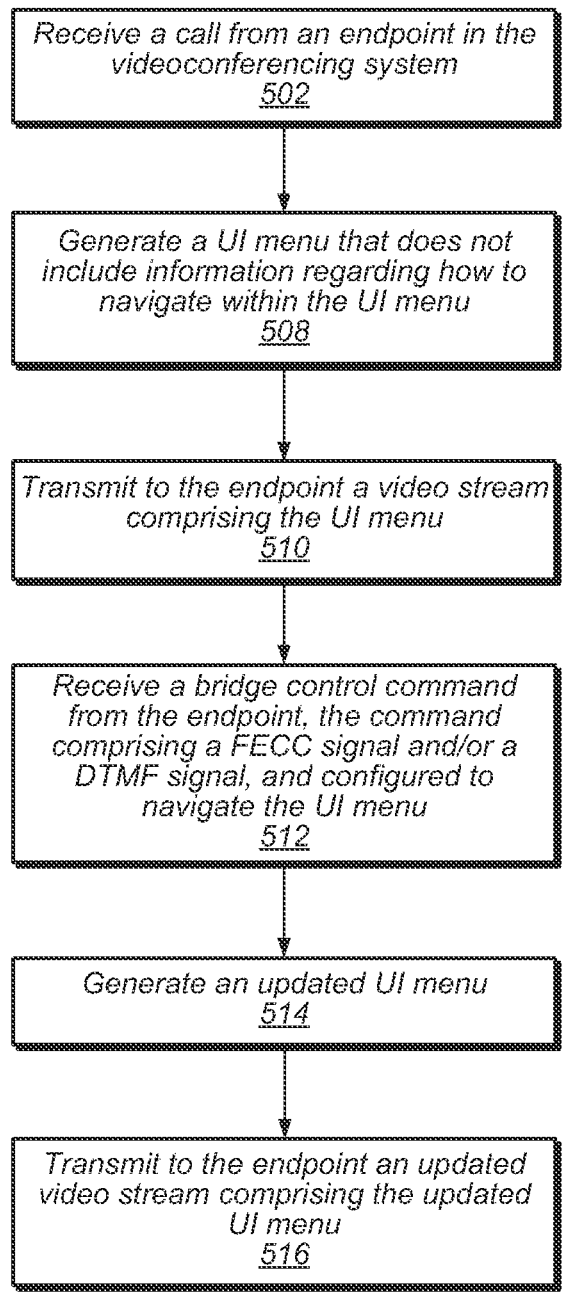
FIGS. 5A and 5B are flowchart diagrams illustrating embodiments of a method for controlling a bridge in a videoconferencing system.
Figure 5B:
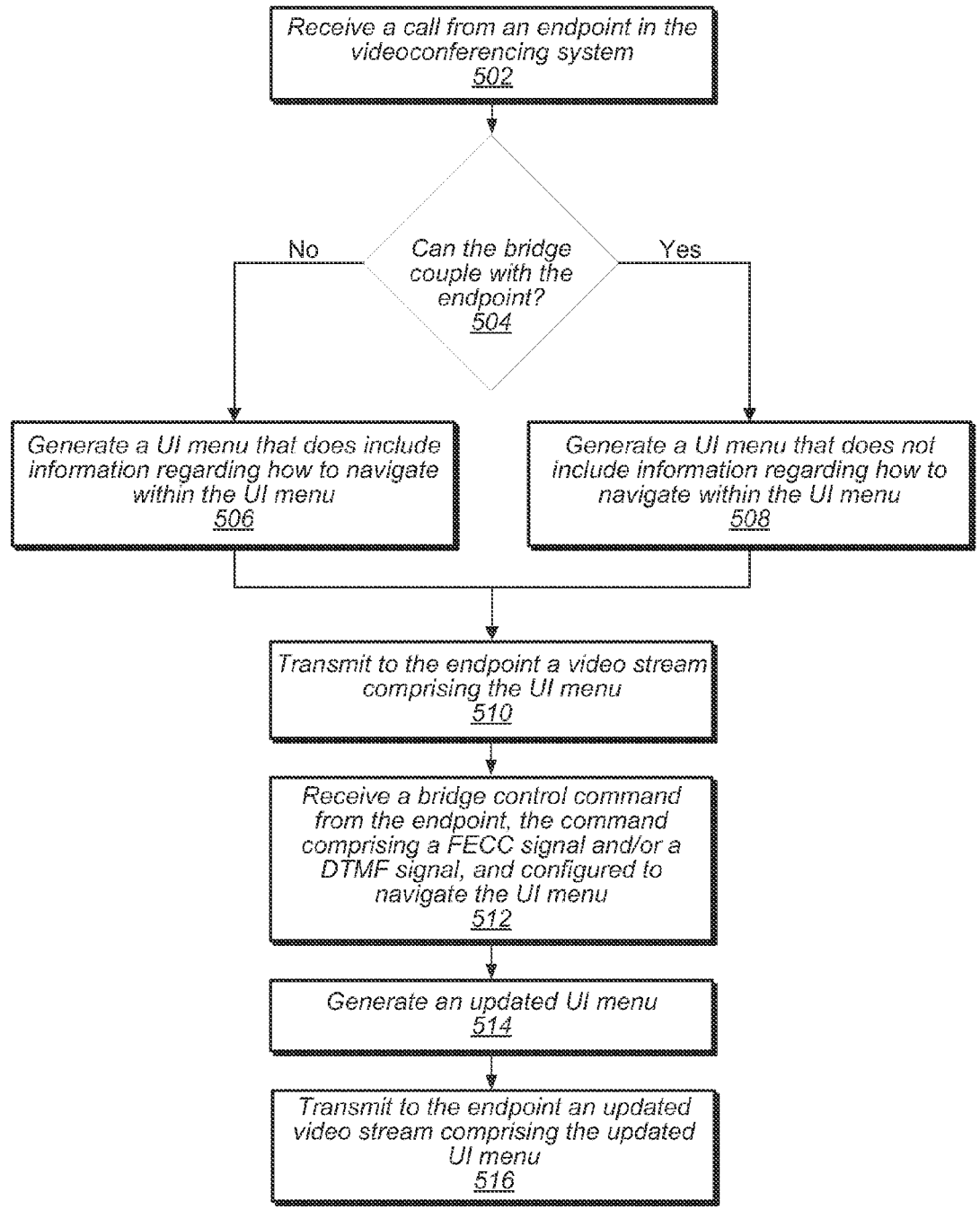

FIGS. 5A and 5B—A Bridge Controlled by a Remote Endpoint

FIGS. 5A and 5B are flowchart diagrams illustrating embodiments of a method for controlling a bridge in a videoconferencing system. The method shown in FIGS. 5A and 5B may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In some embodiments, the method is performed by the bridge.

In 502, the bridge may receive a call from an endpoint in the videoconferencing system. In some embodiments, during this calling, the bridge may receive metadata that indicates device-type information regarding the endpoint, as discussed above with reference to FIGS. 4A and 4B. For example, the device-type information may identify the manufacturer, product name, model number, and/or software version of the endpoint. For example, the transmission of metadata including Vendor Information is provided for in the H.323 standard and SIP. In some embodiments, the bridge may receive the call in a Virtual Operator mode.

In 508, the bridge may generate a UI menu that does not include information regarding how to navigate within the UI menu. In some embodiments, no navigation information is needed, because the UI menu has the appearance and feel of a local UI generated by the endpoint, with which the user is already familiar.

An exemplary UI menu is shown in FIG. 6. As shown, the UI menu may comprise a plurality of user interface elements. For example, the UI menu may comprise a user interface element, the selection of which will configure the bridge to add the endpoint to an ongoing conference. Other exemplary user interface elements are also shown, representing options to create a new conference or to otherwise configure the bridge. In some embodiments, the UI menu may be generated with one user interface element highlighted.

In 510, the bridge may transmit to the endpoint a video stream comprising the UI menu. The video stream may further comprise audio, video, and/or other data from endpoints of the videoconference system. The video stream may further comprise metadata from the bridge. This metadata may indicate device-type information regarding the bridge, and may further indicate an operating mode of the bridge. For example, the metadata may indicate that the bridge is in Virtual Operator mode. In some embodiments, the video stream may comprise the UI menu only if the bridge is in a certain mode; e.g. the Virtual Operator mode.

In 512, the bridge may receive a bridge control command from the endpoint. The command may comprise a FECC signal and/or a DTMF signal. In some embodiments, the command may be configured to navigate the UI menu and select one or more user interface elements within the user interface menu to control one or more aspects of the videoconference. For example, in the exemplary UI menu of FIG. 6, the user interface element [Create a new conference] is shown as highlighted. In some embodiments, a bridge control command comprising a FECC signal corresponding to camera tilt down may navigate the UI menu to highlight the user interface element [Enter a conference ID]. Alternatively, a bridge control command comprising a FECC signal corresponding to camera zoom may select the highlighted user interface element [Create a new conference]. It is to be understood that these specific bridge control commands are only exemplary. In other embodiments, different bridge control commands may be used, and the presented bridge control commands may perform different functions.

In 514, the bridge may generate an updated UI menu. In some embodiments, the updated UI menu may reflect the received bridge control command. For example, if a bridge control command indicating the selection of the highlighted user interface element (e.g. a FECC signal corresponding to camera zoom, in the example above) was received while the UI menu was in the state shown in the exemplary UI menu of FIG. 6, the bridge may generate the exemplary updated UI menu of FIG. 7. The exemplary updated UI menu of FIG. 7 illustrates a menu to allow a user to create a new videoconference. This updated UI menu reflects the received bridge control command selecting the user input element [Create a new conference] of the UI menu of FIG. 6.

In 516, the bridge may transmit to the endpoint an updated video stream comprising the updated UI menu.

FIG. 5B illustrates additional steps in another embodiment of the method.

In 504, the bridge may analyze the metadata received during the call from the endpoint in step 502, to determine whether the endpoint is of a type that is capable of converting generic menu-navigation user input commands into bridge control commands. For example, the bridge may analyze device-type information comprised in the metadata. For example, the bridge may comprise a list or table of endpoint devices, manufacturers, software versions, or other device-type information identifying endpoints with which the bridge is capable of coupling.

If the bridge determines that the endpoint is of a type that is capable of converting generic menu-navigation user input commands into bridge control commands, then the bridge and the endpoint may be referred to as "coupled" or "loosely-coupled." In this case, steps 508-516 may be carried out as presented above with reference to FIG. 5A. Specifically, in 508, the bridge may generate a UI menu that does not include information regarding how to navigate within the UI menu. For example, when the bridge and the endpoint are coupled, the UI menu may not include any instructions to place the endpoint, or a local user interface generated by the endpoint, into a FECC mode or DTMF mode to enable user interaction with the user interface menu. Further, in some embodiments, the video stream may not include any information indicating that navigating the user interface menu may be performed by transmitting to the bridge a FECC signal or a DTMF signal. Such information may be unnecessary because the coupled endpoint is capable of abstracting this control by converting generic menu-navigation user input commands into bridge control commands comprising a FECC signal and/or a DTMF signal.

Figure 8:
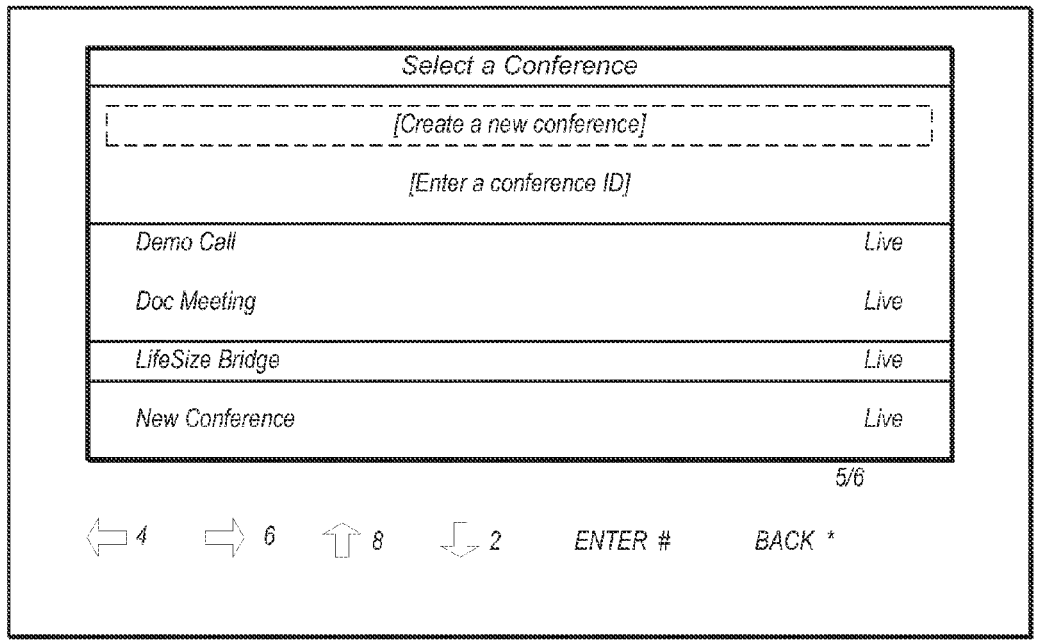

If the bridge determines that the endpoint is not of a type that is capable of converting generic menu-navigation user input commands into bridge control commands, then the bridge and the endpoint are not coupled. In this case, in 506, the bridge may generate a UI menu that does include information regarding how to navigate within the UI menu. An exemplary UI menu including information regarding how to navigate within the UI menu is shown in FIG. 8. In the exemplary UI menu of FIG. 8, the user interface element [Create a new conference] is shown as highlighted. The UI menu also includes instructions indicating that a user may navigate down in the menu (i.e. selecting the user input element [Enter a conference ID]) by generating a DTMF signal corresponding to pressing a "2" button on a telephone. Alternatively, a user may select the highlighted user interface element [Create a new conference] by generating a DTMF signal corresponding to pressing a "#" button on a telephone. A user may generate these DTMF signals, e.g., by pressing the corresponding alphanumeric button on a telephone or other input device of the endpoint. It is to be understood that this specific navigation information is only exemplary. In other embodiments, different navigation information may be used, and the presented navigation information may perform different functions.

If navigation information included in the UI menu comprises FECC signals, the user may generate the signals, e.g., by pressing a corresponding button on a FECC remote control device or other control device at the endpoint dedicated to FECC control. Alternatively, a local UI generated by the endpoint may include a FECC mode display and/or a DTMF mode display, which may be displayed concurrently with the UI menu. Such a FECC mode display or DTMF mode display may allow the user to expressly send a FECC or DTMF signal. If the bridge and the endpoint are not coupled, the UI menu may include instructions to place the local UI generated by the endpoint into such a FECC mode or DTMF mode.

From step 506, the method may proceed to step 510, in which the bridge may transmit to the endpoint a video stream comprising the UI menu. Steps 510-516 may be carried out as presented above with reference to FIG. 5A. At step 514, the updated UI menu may also include information regarding how to navigate within the updated UI menu, or not, depending upon whether the bridge and the endpoint are coupled.

Figure 10:
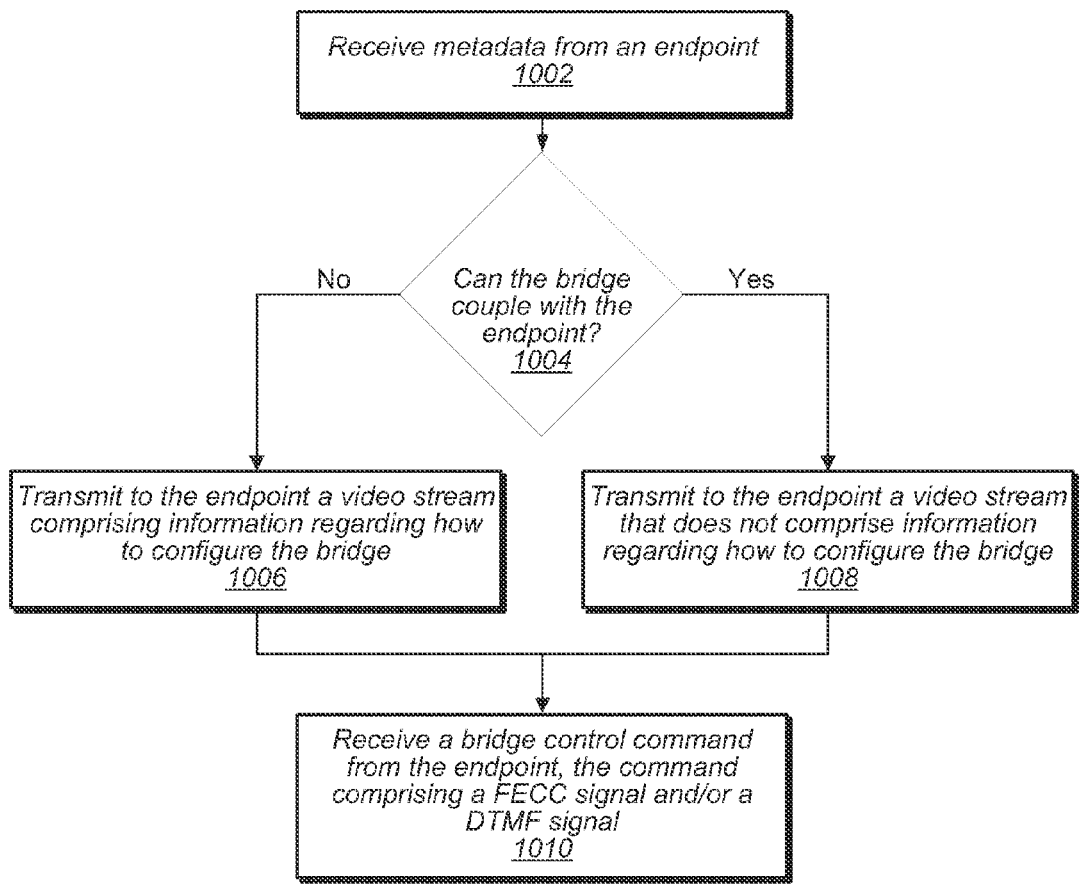
FIG. 10 is a flowchart diagram illustrating an embodiment of a method for controlling a bridge in a videoconferencing system.

FIG. 10—A Bridge Controlled by a Remote Endpoint

FIG. 10 is a flowchart diagram illustrating an embodiment of a method for controlling a bridge in a videoconferencing system. The method shown in FIG. 10 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In some embodiments, the method is performed by the bridge.

In 1002, the bridge may receive metadata from and endpoint. The metadata may comprise device-type information, as discussed above in reference to FIGS. 4A-4B and 5A-5B.

In 1004, the bridge may analyze the device-type information comprised in the metadata to determine whether the endpoint is of a device-type that is capable of converting generic menu-navigation user input commands into bridge control commands. For example, the bridge may comprise a list or table of endpoint devices, manufacturers, software versions, or other device-type information identifying endpoints with which the bridge is capable of coupling. This list or table may be stored in a memory medium of the bridge, encoded in the operating software of the bridge, or stored in any other way in which it may be accessed by the bridge. If the bridge determines that the endpoint is of a type that is capable of converting generic menu-navigation user input commands into bridge control commands, then the bridge and the endpoint may be referred to as "coupled" or "loosely-coupled."

If the bridge determines that the endpoint is not of a type that is capable of coupling with the bridge, then in 1006, the bridge may transmit to the endpoint a video stream comprising information regarding how to configure the bridge. An exemplary embodiment of a video stream comprising information regarding how to configure the bridge is shown in FIG. 8, and is discussed above. A video stream comprising information regarding how to configure the bridge may or may not comprise a UI menu generated by the bridge. In some embodiments, the inclusion of a UI menu may depend upon the operating mode of the bridge.

If the bridge determines that the endpoint is of a type that is capable of coupling with the bridge, then in 1008, the bridge may transmit to the endpoint a video stream that does not comprise information regarding how to configure the bridge. Exemplary embodiments of a video stream that does not comprise information regarding how to configure the bridge are shown in FIGS. 6-7, and are discussed above. A video stream that does not comprise information regarding how to configure the bridge may or may not comprise a UI menu generated by the bridge. In some embodiments, the inclusion of a UI menu may depend upon the operating mode of the bridge. For example, FIGS. 6-7 illustrate exemplary embodiments in which the video stream comprises a UI menu. In some embodiments, one of the UI menus illustrated in FIGS. 6-7 may be comprised in the video stream when the bridge is in Virtual Operator mode.

Figure 9:
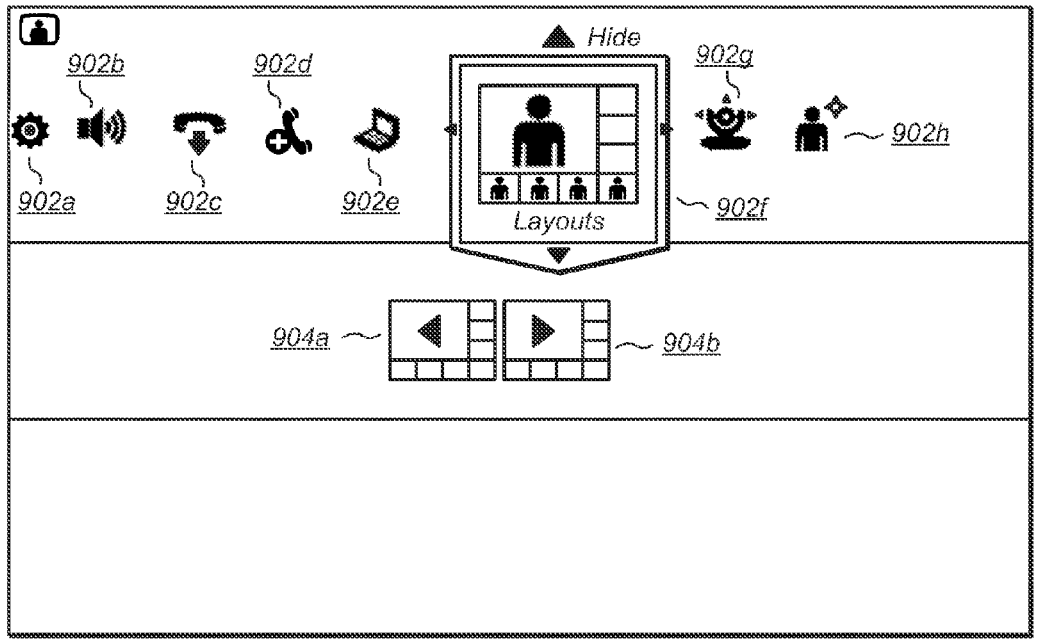
FIG. 9 illustrates an exemplary embodiment of a local user interface generated by an endpoint in a videoconferencing system.

FIG. 9 illustrates an embodiment in which the video stream that does not comprise information regarding how to configure the bridge, and also does not comprise a UI menu. The embodiment of FIG. 9 may represent an image displayed on the display of the endpoint while the bridge is in a Call mode. In some embodiments, the bridge may be placed in Call mode when the endpoint joins a videoconference. Specifically, FIG. 9 illustrates a local UI, generated by the coupled endpoint, overlaid upon the video stream. In the exemplary embodiment of FIG. 9, the endpoint is configured to receive user input comprising generic menu-navigation user input commands, and to convert the generic menu-navigation user input commands into bridge control commands. Because the coupled endpoint is capable of performing this conversion, the bridge does not need to provide information regarding how to configure the bridge.

Figure 11:
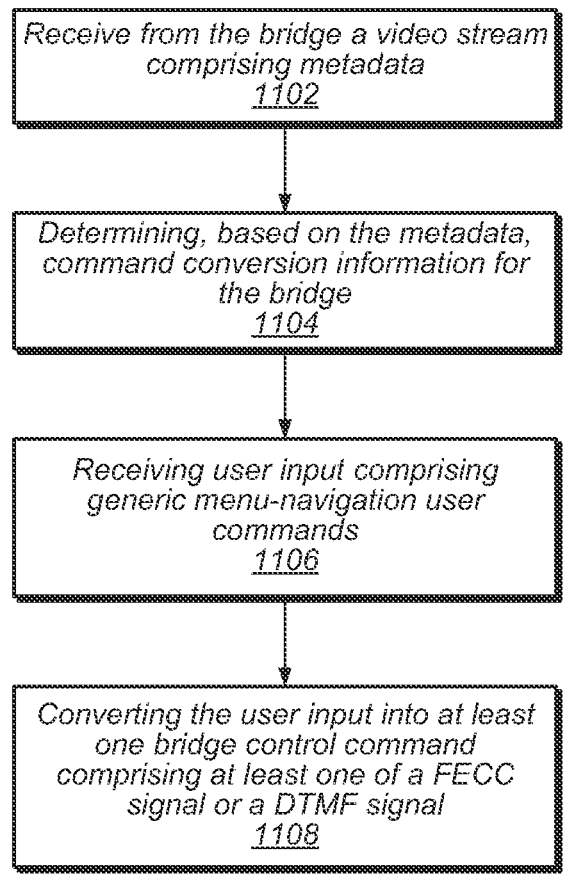
FIG. 11 is a flowchart diagram illustrating an embodiment of a method for controlling a bridge in a videoconferencing system.

FIG. 11—Controlling a Bridge with a Remote Endpoint

FIG. 11 is a flowchart diagram illustrating an embodiment of a method for controlling a bridge in a videoconferencing system. The method shown in FIG. 11 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In some embodiments, the method is performed by a remote endpoint of the videoconferencing system.

In 1102, the endpoint may receive from the bridge a video stream comprising metadata. The metadata may comprise device-type information regarding the bridge, as discussed above with reference to FIGS. 4A and 4B. In some embodiments, the metadata may further comprise an operating mode of the bridge.

In 1104, the endpoint may determine, based on the metadata, command conversion information for the bridge. The command conversion information may comprise information regarding converting generic menu-navigation user input commands into bridge control commands. The bridge control commands may comprise at least one of a FECC signal or a DTMF signal. For example, the endpoint may receive a generic menu-navigation user input command from a user pressing a down arrow on a control device associated with the endpoint. In some embodiments, the command conversion information may comprise information indicating that this generic menu-navigation user input command should be converted to a DTMF signal corresponding to pressing a "2" button on a telephone. Alternatively, the command conversion information may comprise information indicating that this generic menu-navigation user input command should be converted to a FECC signal corresponding to camera tilt down. It is to be understood that these specific conversions are only exemplary. In some embodiments, the command conversion information may depend upon the device-type information comprised in the metadata. For example, in some embodiments, different command conversion information may be required based on the hardware or software type of the bridge. In some embodiments, the command conversion information may further depend upon the operating mode of the bridge, as comprised in the metadata.

The endpoint may comprise a list or table of command conversion information for bridges of various device types and operating modes. This list or table may be stored in a memory medium of the endpoint, encoded in the operating software of the endpoint, or stored in any other way in which it may be accessed by the endpoint.

In 1106, the endpoint may receive user input comprising generic menu-navigation user commands. For example, if the endpoint has an associated remote control device, such as remote control device 150, the user may navigate among user input elements displayed on the display of the endpoint using directional arrow buttons. For example, in the exemplary UI menu of FIG. 6, the user interface element [Create a new conference] is shown as highlighted. The user could highlight the user interface element [Enter a conference ID] by pressing the down arrow. Alternatively, the user could select the user interface element [Create a new conference] by pressing the OK button.

In 1108, the endpoint may convert the generic menu-navigation user commands into at least one bridge control command comprising at least one of a FECC signal and/or a DTMF signal.

This will be further described with reference to the exemplary embodiments of FIGS. 6 and 9.

FIG. 6 illustrates a video stream comprising a UI menu generated by the bridge. In some embodiments, a bridge in Virtual Operator mode may transmit to the endpoint this exemplary video stream comprising the UI menu. In some such embodiments, the endpoint may determine that the bridge is in Virtual Operator mode, based on the metadata. In response to this determining, the endpoint may hide its locally generated UI, and convert any received generic menu-navigation user input commands to bridge control commands configured to navigate the UI menu, according to the command conversion information. Such embodiments are further discussed above, with reference to FIGS. 4A and 4B.

In such embodiments, a bridge in Call mode may transmit to the endpoint a video stream that does not comprise a UI menu. The endpoint may determine that the bridge is in Call mode, based on the metadata. In response to this determining, the endpoint may show its locally generated UI, and dynamically determine whether to convert a generic menu-navigation user input command to a bridge control command according to the command conversion information.

For example, FIG. 9 illustrates a local UI generated by the endpoint, and overlaid upon a video stream that does not comprise a UI menu. In this exemplary embodiment, a user may select between user input elements 902*a*-902*h* of the local UI, e.g. by pressing the left and right arrow buttons on a control device associated with the endpoint, such as remote control device 150. When user input element 902*f* is selected, as illustrated, the local UI may display user input elements 904*a*-904*b*. The user may highlight one of these user input elements by using the arrow buttons of the control device, and may select one of these user input elements, e.g. by pressing the OK button. In this example, user input elements 904*a* and 904*b* may represent selecting the previous or subsequent screen layout from a list of screen layouts available to the bridge. For example, if the user selects user input element 904*a* by highlighting it and pressing the OK button, the endpoint may convert that generic menu-navigation user input command to a bridge control command according to the command conversion information. For example, the user input corresponding to pressing the OK button may be converted to a DTMF signal corresponding to pressing a "#" button on a telephone. Alternatively, the user input corresponding to pressing the OK button may be converted to a FECC signal corresponding to camera zoom. It is to be understood that these specific conversions are only exemplary. As demonstrated by this example, the command conversion information in a specific embodiment may provide the correct conversion, which may be based upon several factors, including device-type of the bridge and mode of operation of the bridge.

Advantages

The described embodiments may provide at least the following advantages. As indicated in the description of the related art, previous methods required users to have advanced knowledge of procedures for utilizing DTMF or FECC signals to control a bridge through a remote endpoint. Therefore, a videoconferencing system employing a previous method would typically be required to display instructions informing the user regarding how to utilize such control signals. Additionally, videoconferencing systems employing previous methods typically required remote controls that were overly complex, or required dedicated remote controls for certain functions, such as camera control.

By contrast, using the methods described above, a user may control a bridge through a remote endpoint, using a simple and intuitive remote control device. Further, the user is not required to have any knowledge relating to sending FECC or DTMF commands. Nor must the videoconferencing system present instructions regarding such commands to the user. To the contrary, the user may experience a seamless user interface experience, and may not even discern that some user inputs configure the endpoint while other user inputs configure the bridge.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for controlling a bridge in a videoconferencing system, wherein the method is performed by an endpoint of the videoconferencing system, the method comprising:
   the endpoint calling the bridge to join a videoconference;
   receiving, from the bridge, a video stream comprising a user interface menu generated by the bridge and further comprising metadata that indicates that the bridge is in virtual operator mode, wherein the video stream comprises the user interface menu when the bridge is in the virtual operator mode, wherein the video stream comprising the user interface menu is received in response to said calling the bridge to join the videoconference;
   displaying the video stream comprising the user interface menu on a display of the endpoint;
   wherein the endpoint 1) does not receive from the bridge any information regarding how to navigate within the user interface menu; and 2) does not present to a user any information regarding how to navigate within the user interface menu;
   receiving, by the endpoint, user input navigating within the user interface menu and selecting one or more user interface elements within the user interface menu to control one or more aspects of the videoconference, wherein said receiving user input comprises receiving user input selecting a user input element comprised in the user interface menu;
   determining, by the endpoint, that the bridge is in the virtual operator mode based on the metadata comprised in the video stream;
   based on the determining, the endpoint converting the user input into at least one bridge control command comprising at least one of a far-end camera control (FECC) signal or a dual-tone multi-frequency (DTMF) signal;
   based on the determining, the endpoint transmitting the at least one bridge control command to the bridge, wherein the bridge control command is configured to navigate the user interface menu;
   receiving from the bridge an updated video stream, the updated video stream comprising an updated user interface menu which reflects the user input selecting the user input element.

2. The method of claim 1, wherein the endpoint is not required to be placed in a FECC mode by the user to enable user interaction with the user interface menu.

3. The method of claim 1, wherein the endpoint does not receive any instructions from the bridge to place the endpoint in a FECC mode to enable user interaction with the user interface menu.

4. The method of claim 1, wherein the endpoint does not present to the user any information indicating that the at least one bridge control command comprises at least one of a FECC command or a DTMF signal.

5. The method of claim 1,
   wherein the endpoint calling the bridge to join a videoconference comprises the endpoint providing second metadata that indicates device-type information regarding the endpoint;
   wherein the endpoint receives, from the bridge, the video stream comprising the user interface menu generated by the bridge in response to the bridge determining, based on the second metadata, that it can couple the endpoint.

6. A method for controlling a bridge in a videoconferencing system, the method comprising:
- receiving, at the bridge, a call from an endpoint in the videoconferencing system, wherein the call from the endpoint comprises metadata which indicates device-type information regarding the endpoint;
- transmitting from the bridge to the endpoint, in response to said receiving a call, a video stream comprising a user interface menu generated by the bridge, wherein the video stream does not include any information regarding how to navigate within the user interface menu, wherein said transmitting a video stream further comprises:
  - determining from the device-type information whether the bridge can couple with the endpoint;
  - if the bridge can couple with the endpoint, generating the user interface menu, wherein the user interface menu does not include any information regarding how to navigate within the user interface menu; and
  - if the bridge cannot couple with the endpoint, generating the user interface menu, wherein the user interface menu includes information regarding how to navigate within the user interface menu;
- receiving, at the bridge, a bridge control command from the endpoint, wherein the bridge control command is configured to navigate the user interface menu, and wherein the bridge control command comprises at least one of a far-end camera control (FECC) signal or a dual-tone multi-frequency (DTMF) signal.

7. The method of claim 6, further comprising:
- generating an updated user interface menu in response to receiving the bridge control command; and
- transmitting from the bridge to the endpoint an updated video stream, the updated video stream comprising the updated user interface menu.

8. The method of claim 6,
- wherein the video stream further comprises metadata that indicates that the bridge is in virtual operator mode;
- wherein the video stream comprises the user interface menu when the bridge is in the virtual operator mode.

9. A method for controlling a bridge in a videoconferencing system, the method comprising:
- receiving, at the bridge, metadata from an endpoint in the videoconferencing system, wherein the metadata comprises device-type information regarding the endpoint;
- determining from the device-type information whether the bridge can couple with the endpoint;
- if the bridge cannot couple with the endpoint, transmitting from the bridge to the endpoint a video stream comprising information regarding how to configure the bridge, wherein the information identifies at least one of a far-end camera control (FECC) signal or a dual-tone multi-frequency (DTMF) signal that may be used to configure the bridge;
- if the bridge can couple with the endpoint, transmitting from the bridge to the endpoint a video stream that does not comprise information regarding how to configure the bridge; and
- receiving, at the bridge, a bridge control command from the endpoint, wherein the bridge control command comprises at least one of a FECC signal or a DTMF signal.

10. A method for controlling a bridge in a videoconferencing system, wherein the method is performed by an endpoint of the videoconferencing system, the method comprising:
- receiving, from the bridge, a video stream comprising metadata, wherein the metadata comprises device-type information regarding the bridge;
- determining, based on the device-type information, command conversion information for the bridge, wherein the command conversion information comprises information regarding converting user input commands configured to navigate a local user interface menu generated by the endpoint into bridge control commands, wherein the bridge control commands comprise at least one of a far-end camera control (FECC) signal or a dual-tone multi-frequency (DTMF) signal;
- receiving user input comprising user input commands configured to navigate a local user interface menu generated by the endpoint;
- converting, based on the command conversion information, the user input into at least one bridge control command comprising at least one of a FECC signal or a DTMF signal.

11. The method of claim 10,
- wherein the metadata further comprises an operating mode of the bridge; and
- wherein said determining the command conversion information for the bridge is further based on the operating mode of the bridge.

* * * * *